Dec. 16, 1958 L. A. LINDELOF ET AL 2,864,624
SKIS FOR WHEELED AIRCRAFT AND OTHER WHEELED VEHICLES
Filed Aug. 1, 1956 5 Sheets-Sheet 2
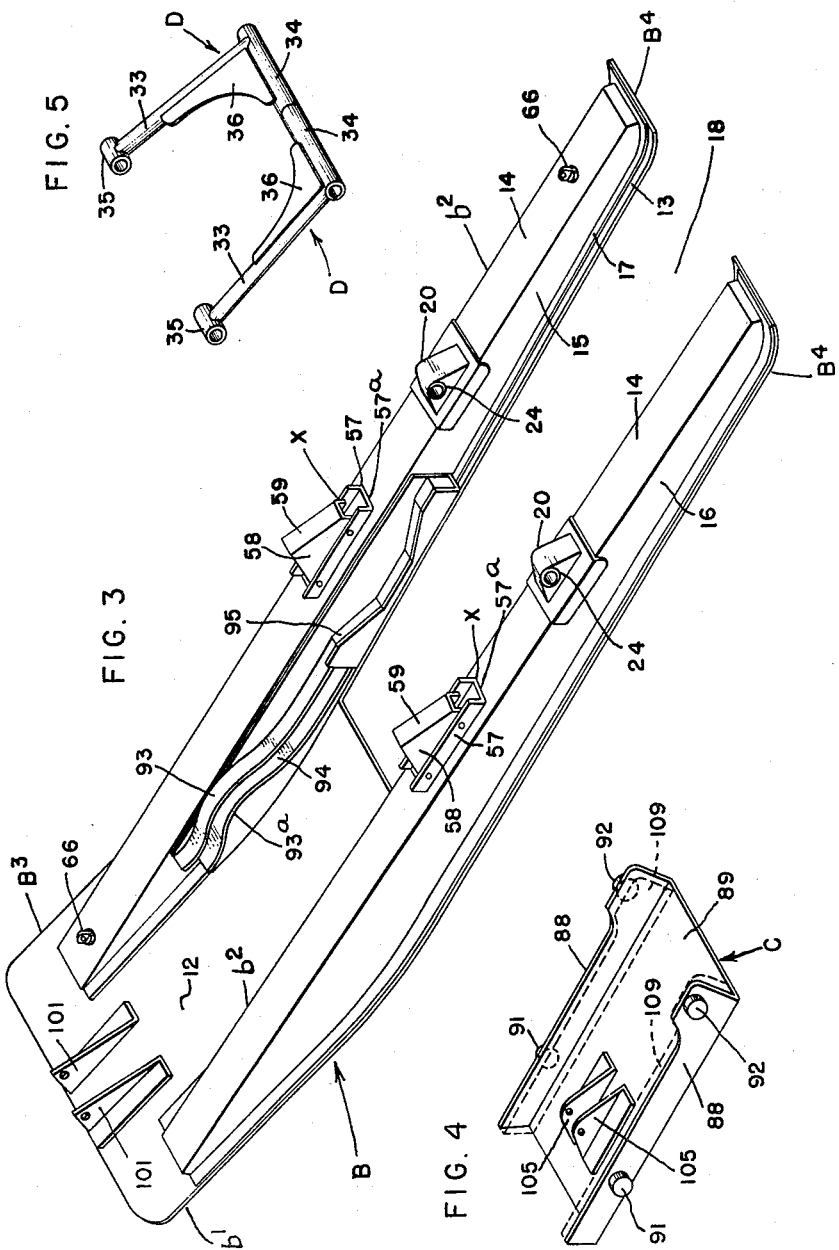
INVENTORS
LEONARD A. LINDELOF
CHARLES W. DREYER
BY *Caswell + Lagaard*

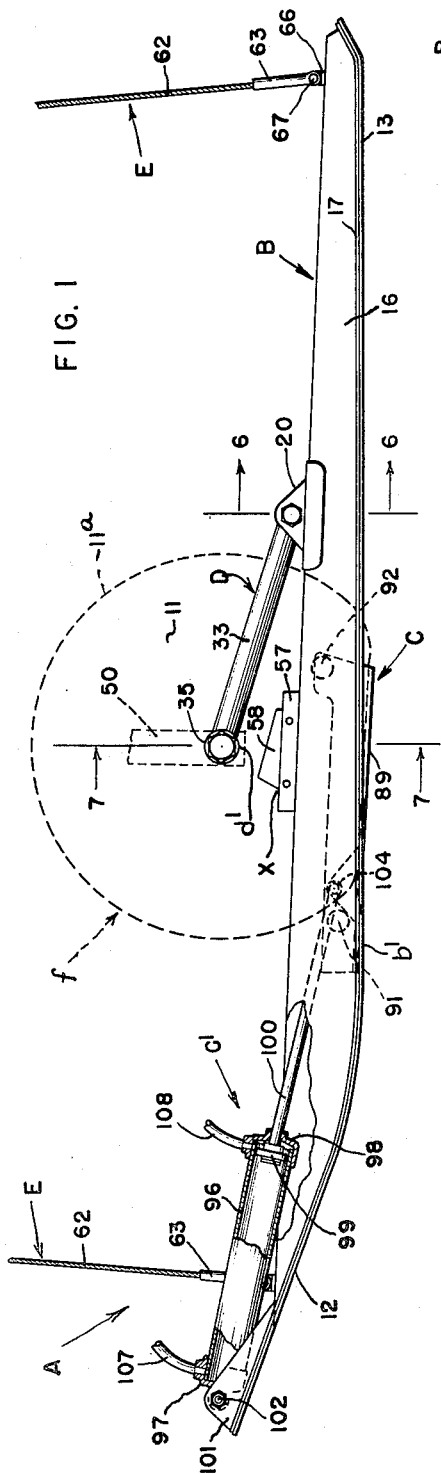
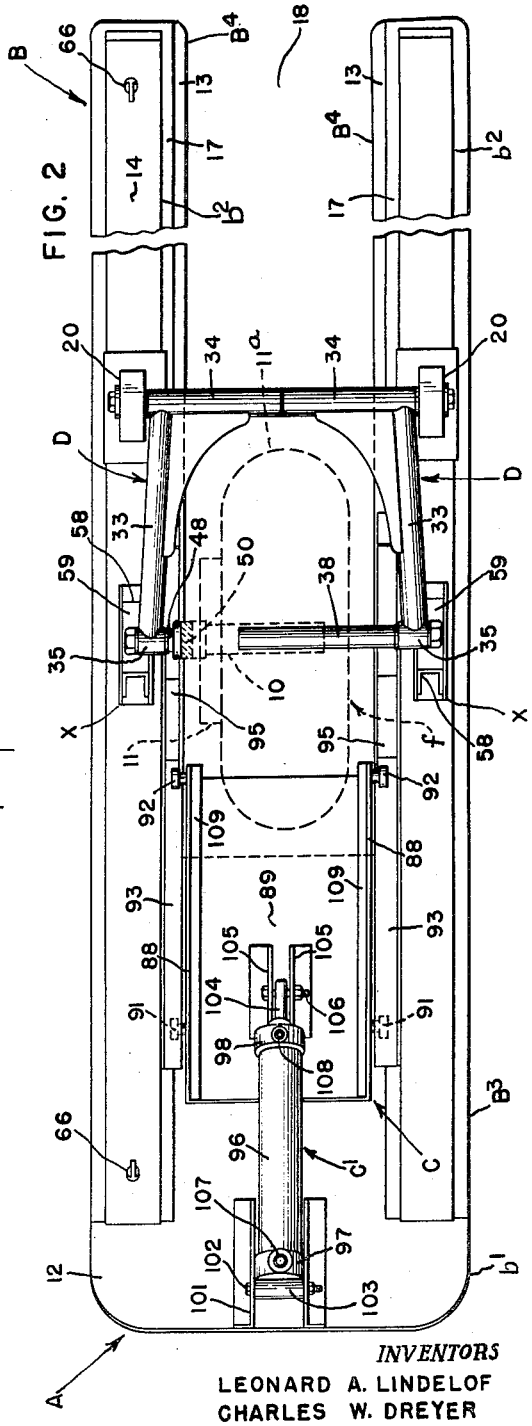

Dec. 16, 1958  L. A. LINDELOF ET AL  2,864,624
SKIS FOR WHEELED AIRCRAFT AND OTHER WHEELED VEHICLES
Filed Aug. 1, 1956  5 Sheets-Sheet 3
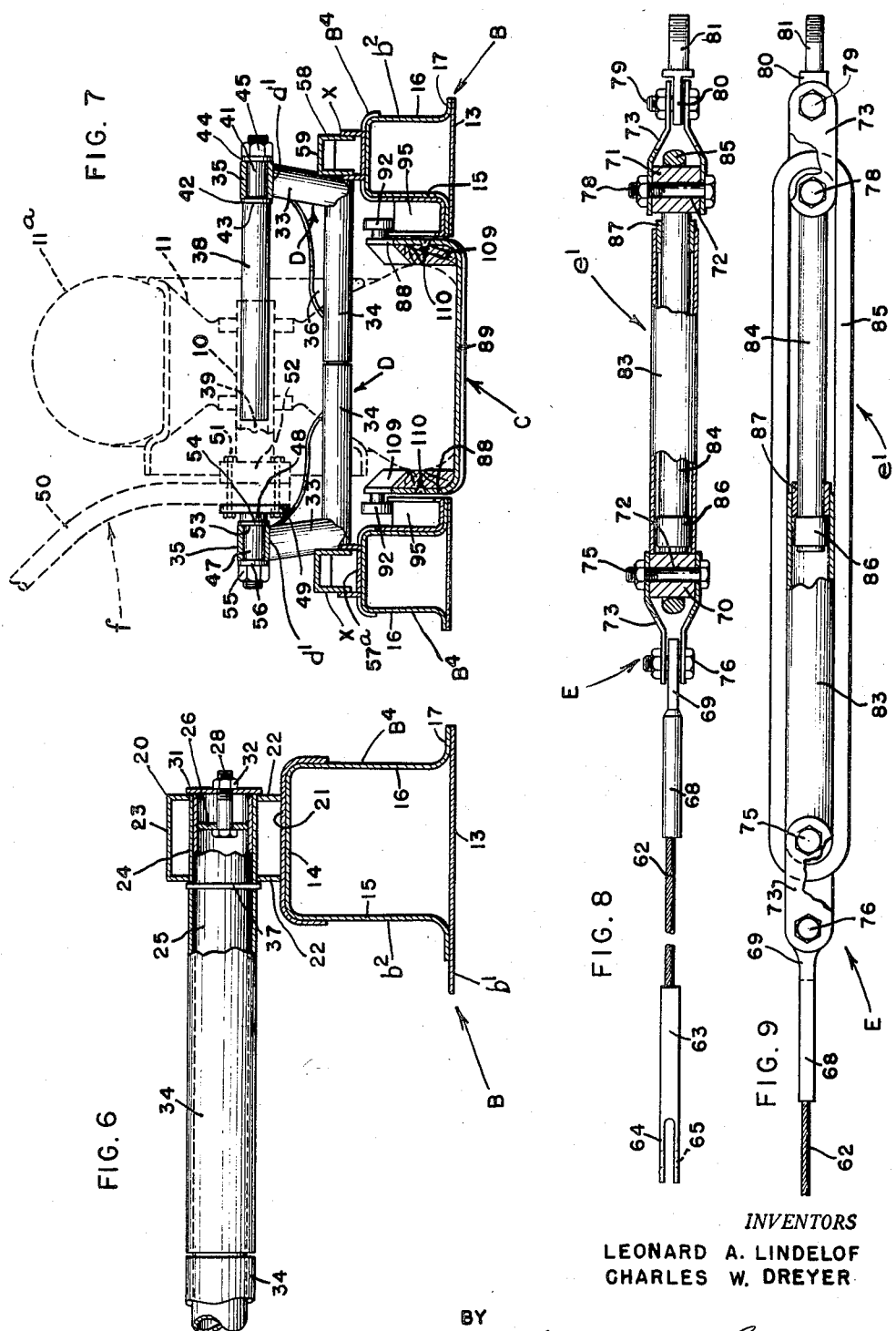
INVENTORS
LEONARD A. LINDELOF
CHARLES W. DREYER
BY
Caswell + Lagaard

*INVENTORS*
LEONARD A. LINDELOF
CHARLES W. DREYER

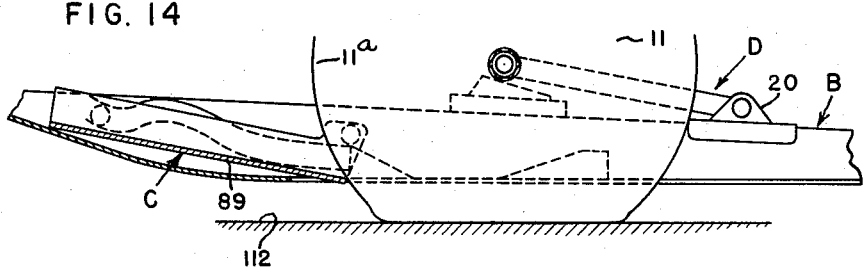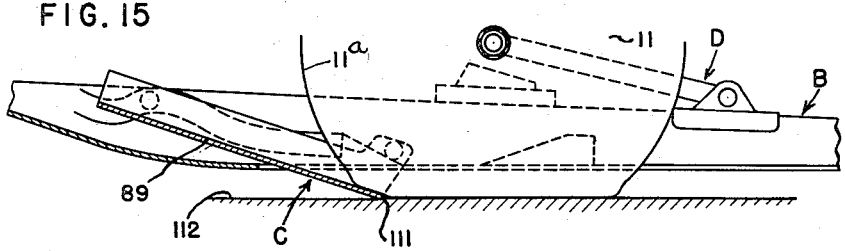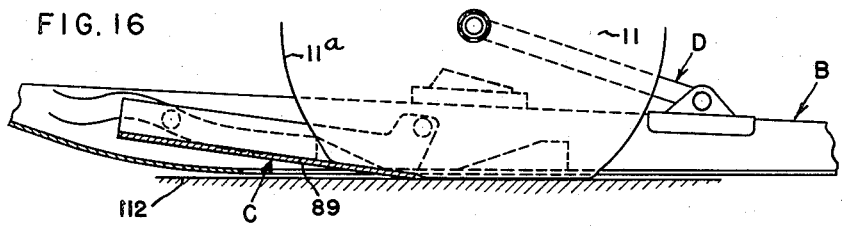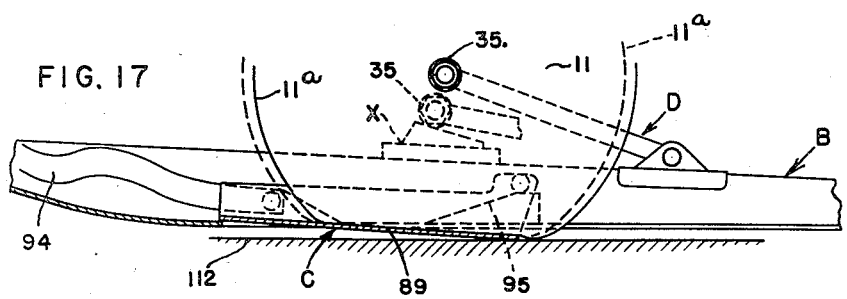

United States Patent Office 2,864,624
Patented Dec. 16, 1958

2,864,624

SKIS FOR WHEELED AIRCRAFT AND OTHER WHEELED VEHICLES

Leonard A. Lindelof, Plymouth Village, and Charles W. Dreyer, Golden Valley, Minn.

Application August 1, 1956, Serial No. 601,443

10 Claims. (Cl. 280—11)

This invention relates to improvements in skis for wheeled aircraft and other wheeled vehicles.

The invention involves the provision of a novel ski structure for association with the wheel of a vehicle in which structure the body of the ski is adjustable into either of two positions relative to the wheel, one position being a primary skiing position wherein the ski body, to the exclusion of the wheel, serves as the sole vehicular medium, the other position being a secondary skiing position of the body of the ski wherein it, as well as the wheel, may serve as a vehicular medium.

It is an object of the invention, therefore, to provide a simple, durable and relatively inexpensive ski structure of the nature aforesaid, which is relatively light in weight and capable of ready application to a vehicle in association with a wheel thereof, and which is highly efficient in an installation in which it is employed.

Developments in the instant art, especially in connection with aircraft, have met with varying degrees of success but, insofar as known, they have failed to provide important features of construction residing in the present invention.

In associating a ski with the landing wheel of an aircraft, it is desirable that the body of the ski be lowered relative to the wheel from an upper sceondary skiing position to a lower primary skiing position and vice versa in all stages of flight and ground operation, without appreciably lifting or lowering the aircraft, and without appreciably changing the fore and aft relationship between the ski body and the craft. It is also desirable that full rocking action of the body of the ski be preserved in its elevated position to provide for efficient secondary skiing operation of the ski supplementary to the landing wheel in the functioning thereof as the then principal vehicular medium. And it is further importantly desirable that the landing wheel be bottomed on the ski during its primary skiing operation so that full advantage to the craft of the cushioning effect of the tire of the wheel may be had in such operation.

More particularly, therefore, it is an object of this invention to provide a ski adapted efficiently to meet the desiderata aforesaid.

The various objectives of the present invention are attained in a construction wherein the body of the ski has a load transfer shoe thereon, said construction including a drag link which extends generally fore and aft of the ski body and connects it to the aircraft. This drag link locates the body of the ski co-directionally relative to its associated landing wheel in position intermediately juxtaposed with respect to the wheel, and said link substantially maintains the fore and aft relationship between the ski body and the aircraft. The body of the ski is movable upwardly alongside the wheel toward the level of its axis to an upper position where the ski body, at a point approximately midlength thereof, rockingly engages a limit stop. Tensional suspension means hung from the craft yieldingly holds the body of the ski in its upper position against said limit stop. The load transfer shoe is mounted on the body of the ski for movement longitudinally thereof, and an actuator for the shoe, also mounted on the ski body, moves the shoe rearwardly of the ski body and forwardly in return to a starting position ahead of the landing wheel. Said shoe-shifting actuator includes coacting members, one member being anchored to the body of the ski and the other member being connected to the shoe. Said load transfer shoe includes a tread plate for the associated aircraft wheel, and the shoe is guided on the body of the ski so that the tread plate is inclined relative thereto, rearward end lowermost, in ramp-like fashion generally tangential to the wheel with its rearward portion projecting beneath the bottom of the body of the ski.

The rearward and forward movements of the load transfer shoe relative to the ski body are attended with one or the other of two results or a combination of such results, depending upon the firmness of the footing, if any, encountered by the ski. One of said results arises in flight and in other operations wherein there is no substantial resistance by a footing medium to movement of the shoe relative thereto, said result being characterized by coaction of the rearwardly moving tread plate with the landing wheel, leading to the lowering of the body of the ski against the action of its tensional supporting means and the underrunning of the tread plate beneath the foot of the landing wheel, or by the withdrawal of the forwardly moving tread plate from the wheel, freeing the body of the ski to the ski-lifting action of said tensional supporting means. The other of said results arises in the presence of substantial resistance by a footing medium to movement of the shoe relative thereto, said last result being characterized by load-bearing contact of the tread plate with the firm footing leading to forward or rearward movement of the ski body and its associated link-connected vehicle, by the actuator, and the consequent rolling of the wheel onto or off from the tread plate.

With the foot of the landing wheel superimposed upon the tread plate of the load transfer shoe, the cushioning effect of the tire is made available to the aircraft for the primary skiing operation and is fully utilized in such operation.

The tensional ski suspension means yieldingly holds the body of the ski properly trimmed in flight, not only in its elevated position for service secondarily as a vehicular medium, but also in the lower position of the body of the ski where it serves primarily and solely as the vehicular medium of the craft. In both of the upper and lower positions of the body of the ski, rocking or pitching movements thereof, desirable in skiing operations, are permitted by the tensional ski suspension means, such rocking or pitching movements of the ski being appropriately restricted by suitably limiting the extensibility of said yielding suspension means.

The change in angularity of the drag link, occurring upon movement of the body of the ski from its upper secondary skiing position to its lower primary skiing position, or vice versa, results in slight change in the fore and aft relationship between the body of the ski and the aircraft, but said change is so slight that it tends only very slightly to shift the center of gravity of the ski body relative to the aircraft. And even this slight tendency to change the center of gravity of the ski body is countered by a compensating shifting of the shoe on the ski body with the net result that hardly any appreciable change occurs in the relationship of the center of gravity of the ski with respect to the aircraft. Moreover, since the change in the fore and aft relationship of the ski body and aircraft is slight, there is no substantial change in the position or the action of the means by which the body of the ski is yieldingly suspended.

The rearward portion of the tread plate, projecting beneath the bottom of the body of the ski, constitutes a hydro-step for the ski, the contact area of the step being variable according to the selected positioning of the shoe on the ski body through the medium of the shoe-shifting actuator. Thus, in alighting or taxiing on water or snow or taking off therefrom, it is possible largely to concentrate the drag of water or snow at the tread plate of the ski structure over greater or lesser areas thereof, as may be desired. And in landing, taxiing or standing on ice, or taking off therefrom, the area of contact of the ski structure with the ice will be concentrated at the tread plate, thereby enhancing the control of the craft.

In applying the invention to an aircraft, each of the landing wheels of the undercarriage will be supplied with a ski, and a suitable control mechanism for the shoe-shifting actuator of the skis will be located, by preference, at the operator's station in the fuselage of the aircraft.

The above indicated and other objects of the invention reside in the novel combination and arrangement of parts and in the details of construction hereinafter illustrated and/or described.

In the drawings:

Figs. 1 and 2 are side elevational and plan views, respectively, of a ski constructed in accordance with the present invention, the same being shown in association with a landing wheel of an aircraft and in a form in which a drag link for the body of the ski is pivotally connected with the axle of such wheel.

Fig. 3 is a perspective view in detail of the body of the ski shown in Figs. 1 and 2.

Fig. 4 is a perspective view in detail of the load transfer shoe which is movable forth and back on the ski body.

Fig. 5 is a perspective view in detail of the drag links, shown in Figs. 1 and 2, which pivotally connect the ski body to the aircraft.

Fig. 6 is a detail view in vertical section taken as on the line 6—6 of Fig. 1 and drawn to a larger scale.

Fig. 7 is a sectional view taken as on the line 7—7 of Fig. 1 and drawn to a larger scale.

Fig. 8 is a side view in detail of one of the tensional suspension cords for the ski body, portions of the elastic ring unit of such cord structure being broken away to reveal the construction of otherwise concealed parts thereof.

Fig. 9 is a side view of the cord structure shown in Fig. 8, turned axially ninety degrees, with its elastic ring unit stretched out to its fullest extent.

Figs. 14, 15, 16 and 17 are diagrammatic views showing relative positions occupied by the ski body, load transfer shoe, drag links and the grounded aircraft landing wheel at different stages in progression of the load transfer shoe rearwardly of the ski body.

Figure 10:
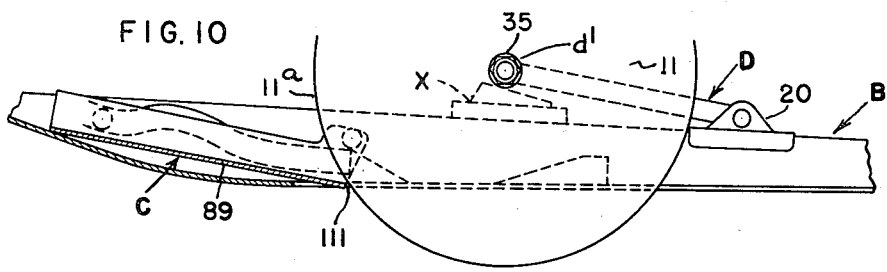
Figs. 10, 11, 12 and 13 are diagrammatic views showing relative positions occupied by the ski body, load transfer shoe, drag links and aircraft landing wheel at different stages in the progression of the load transfer shoe rearwardly of the ski body, as in flight of the aircraft.

Reference being had to the drawings, it will be seen that the illustrated ski structure, indicated in its entirety by the reference letter A, includes a body B on which a load transfer shoe C is movably mounted for movement forth and back longitudinally of said body B. The ski structure A further includes drag links D which connect the ski body B to an aircraft, the pivotal connection of said drag links with the aircraft being shown as made in axial coincidence with the axle 10 of a landing wheel 11 of the craft. Additionally included in the illustrated ski A are tensional suspension cords E which are attached at their lower ends to the body B of the ski and which are adapted to be connected at their upper ends, as best suitable, to the aircraft.

The ski body B includes a runner $b^1$ having a prow portion 12 and spaced-apart legs 13 extending rearwardly therefrom. Beams $b^2$ reinforce the runner $b^1$, there being one beam for each leg 13 of said runner. Each beam $b^2$, at its rear portion, superimposes its respective leg 13 of the runner $b^1$ coextensively therewith and, at its forward portion, overreaches and superimposes the prow portion 12 of said runner $b^1$. Each beam $b^2$ is in the form of an inverted channel having a web 14 forming the top of the beam and having upstanding inner and outer wall flanges 15, 16. Along said wall flanges 15, 16, are outwardly turned base flanges 17 which are riveted or otherwise suitably secured to the legs 13 and prow portion 12 of the runner $b^1$. The body B of the ski A, thus principally constituted by the beam-reinforced runner $b^1$, has a bow $B^3$ with relatively spaced branches $B^4$ extending rearwardly therefrom. The space 18 between said branches $B^4$ of the ski body B receives the aircraft landing wheel 11 (dotted lines, Fig. 2), as will more fully hereinafter appear.

Each branch $B^4$ of the ski body B is provided intermediately thereof with a bearing 20 (Fig. 6) fabricated from sheet metal, the same including a base plate 21, side plates 22, and cap piece 23, there being a bearing sleeve 24 secured at its ends to said side plates 22. The base plate 21 of each bearing 20 rests upon the web 14 of the beam $b^2$ of its respective branch $B^4$ of the ski body B and is suitably secured to such web 14 in position with the sleeve 24 of the bearing 20 coaxially disposed relative to the similar sleeve of the similar bearing 20 on the other branch $B^4$ of the ski body B. Mounted at its ends in the axially aligned sleeves 24 of said bearings 20 is a tubular shaft 25. Within this shaft 25, at each end portion thereof, is a disc-like web 26 edgewise secured to the inner wall surface of the tubular shaft, said web 26 having a central aperture therein for the reception of a headed stay bolt 28 disposed with its head bearing against the inner face of the web 26 and with its threaded end projecting outwardly from the adjacent end of the tubular shaft 25. This threaded end of each stay bolt 28 is received in a central aperture in a disc-like end-thrust plate 31 which overreaches its respective end of the tubular shaft 25 and the adjacent end of its respective bearing sleeve 24. A nut 32 on each stay bolt 28 is backed against its respective end-thrust plate 31. Thus, the stay bolts 28 oppositely coact to deprive the tubular shaft 25 of axial movement in the sleeves 24 of the bearings 20.

The drag links D pivotally connect the ski body B to an aircraft, codirectionally with respect to a landing wheel 11 of the craft, in intermediate juxtaposition relative to said wheel with such wheel received between the branches $B^4$ of the ski body B. These drag links D are pivoted at their rear ends to the ski body B and are adapted to be connected at their forward ends to an aircraft with said links extending generally fore and aft of said ski body, thereby to enable the body B of the ski A to move upwardly from and back to primary skiing disposition at the level of the foot of the aircraft landing wheel 11. Said drag links D permit the upward movement of the ski body B from its lower primary skiing position toward the level of the axis of the aircraft landing wheel 11 to an upper position short of the axis of said wheel in which upper position of the ski body B the ski A can perform its secondary skiing operation.

While a single link D may be employed and pivotally connected at the forward end thereof to an aircraft in any suitable manner, we have shown a pair of similar links D pivotally connected at their forward ends with an aircraft undercarriage $f$, the common pivotal axis of said forward ends of said links D coinciding with the axis of the landing wheel 11 of such undercarriage. Each of the illustrated drag links D consists of a tubular reach or arm 33 and rear and forward sleeves 34, 35, respectively secured to the rear and forward ends of said arm 33, the rear sleeve 34 being secured near one of its ends to the arm 33, and the forward sleeve 35 being secured intermediately thereof to said arm. A reinforcing bracket 36 is secured to the arm 33 and to the rear sleeve 34 of each of the links D. The two links D are relatively oppositely disposed with their rear bearing sleeves 34 receiving the tubular pivot shaft 25 in the bearings 20 on the branches $B^4$ of the ski body A. The inner ends of said rear bearing sleeves 34 of the two links D abut each other and the outer end of each such sleeve 34 abuts against a washer 37 (Fig. 6) which is applied to said pivot shaft 25 and backed against the inner end of the sleeve 24 of the bearing 20 on the corresponding branch $B^4$ of the ski body B.

The forward bearing sleeve 35 of the link D on the outboard side of the ski body A is fitted with a stub shaft 38 the inner end of which is received in the bore 39 of the conventional hollow axle shaft 10 of the aircraft landing wheel 11. The reduced outer end 41 of said stub shaft 38 is received in the forward bearing sleeve 35 of said outboard link D. A thrust washer 42 backed against the shoulder 43 on said stub shaft 38 bears against the inner end of said last mentioned bearing sleeve 35, a companion thrust-washer 44 being backed against the outer end of said sleeve and confronted with a nut 45 screwed on the threaded extremity of said stub shaft 38. The forward bearing sleeve 35 of the link D on the inboard side of the ski body B receives the reduced end 47 of a stub 48 issuing from a mounting flange 49 which is secured to the leg 50 of the aircraft undercarriage $f$ by means of bolts 51 extending through said mounting flange 49, leg 50 and the conventional hub flange 52 of the landing wheel 11, the axis of the stud 48 being disposed coaxially with respect to said stub shaft 38. A thrust-washer 53 backed against a shoulder 54 on the stud 48 bears against the inner end of the forward sleeve 35 on the inboard link D. A nut 55 threaded on the outer end of the stud 48 holds an end-thrust washer 56 on said stud against the outer end of the forward sleeve 35 of said inboard link D.

The upper position which may be assumed by the body B of the ski A, relative to the aircraft wheel 11, is established by providing each of the beams $b^2$ of the ski body B with an abutment $x$ adapted to engage an upper limit stop fixed with respect to the undercarriage structure of the aircraft. In the illustrated construction, each om said abutments $x$ consists of a channel-like base 57 and an inverted channel-like bumper 58, the web $57^a$ of the base 57 being secured to the web 14 of its respective beam $b^2$ of the ski body B, the depending flanges of the bumper 58 being nested between and riveted or otherwise suitably secured to the upturned flanges of said base 57. The web 59 of each bumper 58 slopes downwardly and rearwardly relative to the ski body B and is rockably engageable with the upper limit stop provided therefor. In the construction shown, the upper limit stop $d^1$ for the abutment $x$ on the outboard beam $b^2$ of the ski body B is the forward bearing sleeve 35 of the corresponding drag link D which is mounted on the stub shaft 38 in the hollow landing wheel axle shaft 10, the upper limit stop $d^1$ for the abutment $x$ on the inboard beam $b^2$ of the ski body B being the forward bearing sleeve 35 of the corresponding link D which is mounted on the stud 48 secured to the leg 50 of the aircraft undercarriage $f$.

In the absence of overpowering force, the tensional suspension cords E raise and yieldingly hold the body B of the ski elevated with its abutments $x$ rockably engaged with the upper limit stops $d^1$ for said ski body (Fig. 10). Each of said suspension cords E consists of a cable 62 and an elastic ring unit $e^1$ attached thereto (Figs. 8 and 9). The cable 62 of each suspension cord E has a lower terminal fitting 63 formed with spaced-apart ears 64 having axially aligned apertures 65 therein, said ears straddling an upstanding eye 66 at one end of the inboard beam $b^2$ of the ski body B, said apertures 65 and eye 66 receiving a bolt 67 which fastens the terminal fitting 63 to said eye 66. The upper end of each cable 62 has a terminal fitting 68 thereon formed with an eye 69 with which the companion elastic ring unit $e^1$ is connected. The ring unit $e^1$ of each suspension cord E includes a lower block 70 and an upper block 71, each block being formed with a bore 72 therein. The upper ends of clevis straps 73 embrace opposite sides of the lower block 70 and are formed with apertures therein which receive a fastening bolt 75 extending through the bore 72 of said lower block 70, the lower ends of said clevis straps 73 being fastened by a bolt 76 to the eye 69 of the upper terminal fitting 68 of the companion cable 62. The lower ends of clevis straps 73 embrace opposite sides of the upper block 71 and are formed with apertures therein which receive a fastening bolt 78 extending through the bore 72 of said upper block 71. The said clevis straps 73 are fastened at their upper ends by a bolt 79 to the eye 80 of an anchoring bolt 81 which is suitably connected to the leg 50 of the undercarriage $f$ or other part of an aircraft. A barrel 83, butt-welded to the lower block 70 of the ring unit $e^1$, receives a rod 84 which is butt-welded to the upper block 71 of said ring unit. An endless elastic band 85 embraces said upper and lower blocks 71, 70 of the ring unit $e^1$ acting yieldingly to bring the lower block 70 toward the upper block 71 telescoping the rod 84 into the barrel 83. This movement of the lower block 70 toward the upper block 71 shortens the suspension cord E, such shortening of said cord being limited by engagement of the lower end of the rod 84 with the lower block 70 (Fig. 8). Reverse movement of the lower block 70 relative to the upper block 71, against the action of the elastic band 85, results in the lengthening of the suspension cord E, such lengthening of said cord being limited by engagement of a stop ring 86, on the lower end of the rod 84, with a stop ring 87 within the barrel 83 at its upper end (Fig. 9).

The load transfer shoe C, movable longitudinally of the ski body B between the beams $b^2$ thereof, is a channel-like structure with side flanges 88 upstanding from a tread plate 89 for the pneumatic tire $11^a$ of the landing wheel 11. Each of said side flanges 88 of the shoe C has mounted thereon a forward roller 91 and a rear roller 92. Rails for these rollers 91, 92 are as follows: Secured along the inner wall flange 15 of each of the beams $b^2$ of the ski body B are a pair of upper and lower front rails 93, $93^a$ which define between them a way 94 wherein the forward roller 91 at the adjacent side of the load transfer shoe C is received and guided, the lower front rail $93^a$ providing an upwardly facing track for such roller 91 and the upper front rail 93 providing a downwardly facing track therefor. In rearward continuation of the upper front rail 93 on each of the beams $b^2$ is a rear rail 95 which provides an upwardly facing track for the rear roller 92 at the adjacent side of the load transfer shoe C.

An actuator $c^1$ is provided for shifting the load transfer shoe C forth and back longitudinally of the ski body B. The illustrated shoe-shifting actuator $c^1$ is hydraulically powered. Conventionally, it includes a hydraulic cylinder 96 having a mounting cap 97 at one end thereof and a journal cap 98 at its other end, the cylinder 96 being fitted with a piston 99 and a piston rod 100. Said cylinder 96 extends longitudinally of the ski body B midwidth thereof with the mounting cap 97 of the cylinder 96 lying between anchoring flanges 101 upstanding from the prow portion 12 of the runner $b^1$, said cylinder 96 being attached to said anchoring flanges 101 for vertical pivotal movement by means of a pivot bolt 102 extending through a boss 103 on the mounting cap 97 of the cylinder and through said anchoring flanges 101. The piston rod 100, projecting from said cylinder 96, extends through the journal cap 98 on the cylinder 96 at its rearward extremity, said piston rod being provided with an eye 104 which lies between coupling flanges 105 upstanding from the forward portion of the tread plate 89 of the load transfer shoe C. A pivot bolt 106 extending through said eye 104 on the piston rod 100 and through said coupling flanges 105 on the tread plate 89 pivotally connects the piston rod of the actuator $c^1$ with the shoe C. Oil lines 107, 108, connected with the mounting cap 97 and journal cap 98 of said cylinder 96, communicate with the interior of the cylinder at opposite sides of the piston 99. Preferably, said oil lines 107, 108 will extend to controls at the pilot's station in the fuselage of the aircraft. Rearward movement of the load transfer shoe C on the ski body B is limited by engagement of the piston 99 of the actuator $c^1$ with the journal cap 98 of the cylinder 96 (Fig. 1), the return forward movement of said shoe C on the ski body B being limited (Fig. 2) by engagement of said piston 99 with the mounting cap 97 of said cylinder.

The lower primary skiing position of the body B of the ski A, at the level of the foot of the aircraft landing wheel 11 is shown in Figs. 1, 7, 13 and 17 of the drawings, the load transfer shoe C in each instance occupying its rearward position on the ski body B superimposed by the tire 11$^a$ of said wheel. Figs. 1, 7 and 17 show the wheel 11 as being craft-weighted with the tire 11$^a$ deflected under normal load and resting on the shoe C of the grounded ski. Here, it may be noted that the side flanges 88 of the load transfer shoe C may be fitted with liner or filler strips 109, removably secured in place, as by screws 110 (Fig. 7) extending through the flanges 88 and into the strips 109. This provision, as will be readily seen, adapts the shoe C to a landing wheel which may happen to be of insufficient width under normal load to fill the space between said flanges 88 of the shoe C.

Figure 13:
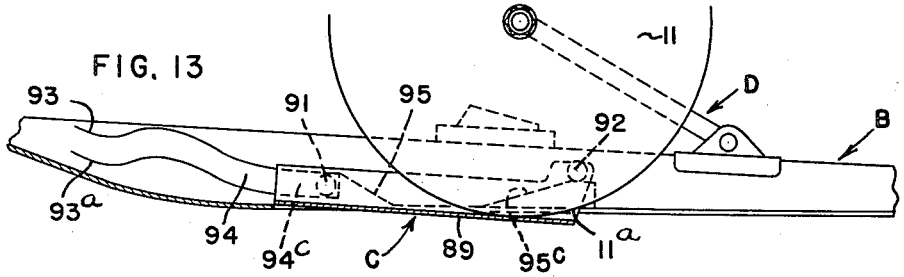

In dotted lines in Fig. 17, the tire 11$^a$ of the craft-weighted wheel 11 is shown fully deflected, as under shock, the attending engagement of the forward sleeve 35 of the drag link D with the abutment $x$ on the ski body B being shown in dotted lines. With the parts of the ski structure and aircraft relatively disposed, as indicated in Figs. 1, 7 and 17, the cushioning effect of the wheel tire 11$^a$ is made available to and fully utilized by the aircraft along with any other intermediary cushioning means of the craft, during all skiing operations wherein the body B of the ski occupies its lower primary skiing position. Fig. 13 shows the aircraft wheel 11 as in flight of the craft, in which case the tire 11$^a$ is without load and fully extended in its contact with the load transfer shoe C.

The upper secondary skiing position of the ski body B at a level above that of the foot of the aircraft landing wheel 11, yet beneath the level of the axis of said wheel, is shown in Figs. 2, 10 and 14. Here, the load transfer shoe C occupies its forward position on the ski body B ahead of the lower forequarter of the wheel 11, said ski body B being yieldingly held in its upper position by the tensional suspension cords E with the abutments $x$ on the ski body B in engagement with the forward bearing sleeves 35 of the drag links D, which sleeves constitute upper limit stops $d^1$, as aforesaid. As shown in Figs. 2 and 14, the grounded aircraft wheel 11 is under static load, while in Fig. 10 the wheel 11 is shown without load, as in flight of the craft.

In all stages of flight and ground operation, the actuator $c^1$ may be operated by the pilot to cause the ski body B to be lowered relative to the aircraft landing wheel 11 from secondary skiing position above the level of the foot of the wheel to primary skiing position with the wheel bottomed on the load transfer shoe C of the ski, or may cause the ski body B to be raised relative to the wheel in return from primary skiing position to secondary skiing position.

Figure 11:
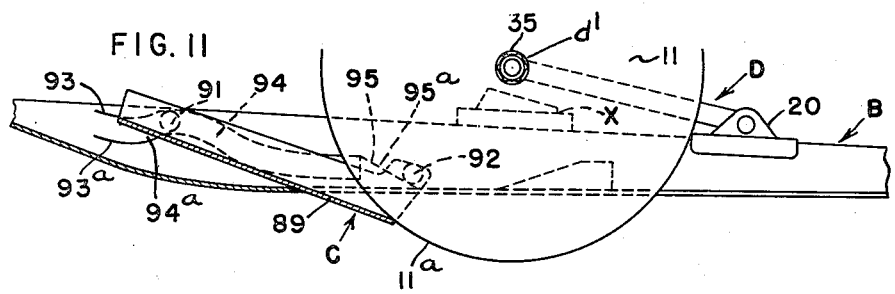
Figure 12:
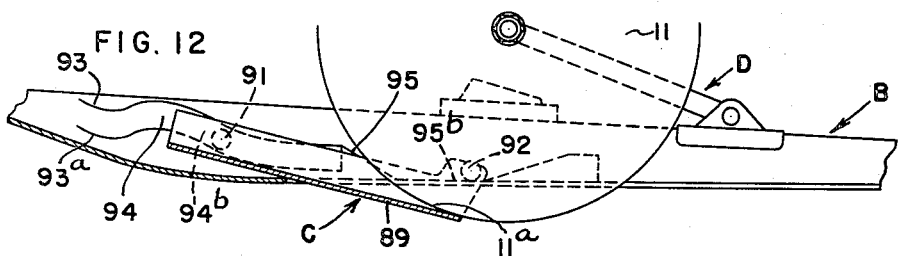

Referring to the diagrammatic views in Figs. 10 to 13, inclusive, all of which show the relation assumed by ski and wheel, as in flight of the aircraft, it will be seen in Fig. 10 that the body B of the ski is in its upper secondary skiing position with the load transfer shoe C forwardly disposed on the ski body B ahead of the wheel 11 and with the lower portion of the wheel projecting downwardly between the branches B$^4$ of the ski body below the bottom thereof for contact with any footing medium to be encountered. To lower the ski body B from its upper secondary skiing position, the actuator $c^1$ (Fig. 1) will be operated to shift the load transfer shoe C rearwardly of the body B of the ski into its rearward position thereon (Fig. 13), the intermediate positions occupied by the said shoe C in its rearward movement being shown in Figs. 11 and 12. At the start of such rearward movement of the shoe C (Fig. 10), the rear edge 111 of the tread plate 89 of said shoe confronts the wheel tire 11$^a$ at about midheight of its lower forequarter with said tread plate 89 slightly inclined rearwardly and downwardly relative to the ski body B. During the initial stage of said rearward movement of the shoe C (see Fig. 11), the forward rollers 91 of the shoe travel up the inclined portions 94$^a$ of their respective ways 94 between the upper and lower forward rails 93, 93$^a$ on the body B of the ski, while the rear rollers 92 of the shoe C travel down the inclined portions 95$^a$ of their respective rear rails 95. Thus, the tread plate 89 of the shoe C is further inclined into substantially tangential relationship relative to the periphery of the wheel tire 11$^a$, contact between said rear edge 111 of the tread plate 89 and said tire 11$^a$ being made near the end of said initial stage of rearward movement of the shoe C. Completing said initial stage of movement of the shoe as seen in Fig. 11, the tread plate 89, then tangentially disposed relative to the wheel 11 and coacting with the tire 11$^a$ near the bottom of the wheel, begins to move the ski body B downward relative to the wheel 11 against the action of the tensional suspension cords E (Fig. 1), such downward movement of the ski body B being attended with the lowering of the abutments $x$ thereon from the forward bearing sleeves 35 of the drag links D providing the upper limit stops $d^1$ for the ski body B. Continuing the rearward movement of the load transfer shoe C (see Fig. 12), the forward rollers 91 thereof travel down the inclined portion 94$^b$ of the ways 94 between the upper and lower front rails 93, 93$^a$ while the rear rollers 92 travel along the level portions 95$^b$ of the rear rails 95. Completing this stage of movement of the shoe C as seen in Fig. 12, the ski body B will be further lowered relative to the wheel 11 and the foot of the tire 11$^a$ will bear on the rear marginal portion of the tread plate 89 in the downwardly and rearwardly inclined ramp-like disposition thereof. The final stage of the rearward movement of the load transfer shoe C on the ski body B (see Fig. 13) terminates upon engagement of the piston 99 of the actuator $c^1$ (Fig. 1) with the journal cap 98 on the cylinder 96. During said final stage of movement of the shoe C, the front rollers 91 thereof will arrive at the end of the rear end portions 94$^c$ of the ways 94 between the upper and lower front rails 93, 93$^a$ (Fig. 13); the rear rollers 92 of the shoe C will travel up the inclined end portions 95$^c$ of the rear rails 95, and the foot of the tire 11$^a$ of the freely idling landing wheel 11 will contact the tread plate 89 further forwardly thereof, the ski body B thereupon taking its lower primary skiing position as seen in Fig. 13. Upon the return of the shoe C from its said rearward position on the ski body B to the forward position thereof, the shoe is shifted forwardly clear of the wheel tire 11$^a$ and the tensional suspension cords E elevate the ski body B into its upper secondary skiing position shown in Fig. 10.

Fig. 14 diagrammatically shows the ski body B in its upper secondary skiing position with the shoe C ahead of the wheel 11 and with the tire 11ª of the wheel grounded on a firm footing 112. Figs. 15, 16 and 17 show successive positions taken by the shoe C in arriving at its rearward position on the ski body B underrunning the grounded wheel 11 and bringing the ski body B down into primary skiing position on said footing 112. It has been seen in previous reference to Figs. 11, 12 and 13 that the rearwardly moving shoe C coacting with the undeflected tire 11ª of the wheel 11, as in flight of the craft, freely underruns the wheel which turns freely to take footing on the shoe. However, when the wheel 11 is grounded on firm footing and the tire 11ª deflected, the shoe C moving rearwardly relative to the ski body B will, at its rear edge 111, engage the footing 112 (Fig. 15.) and also become grounded thereon with the result that the actuator $c^1$ will move the ski body B forward along the footing 112. This forward movement of the ski body B will be imparted to the aircraft through the drag links D (see Figs. 16 and 17) and the craft-weighted wheel 11 will be caused to roll up on the ramp-like tread plate 89 of the load transfer shoe C, the body B of the ski A being therewith depressed into its lower primary skiing position against the action of the tensional suspension cords E (Fig. 17). Reverse operation of the actuator $c^1$ to move the shoe C forwardly relative to the ski body B will first shift the ski body B rearwardly relative to the footing 112 and along with it the link-connected craft, rolling the wheel 11 down the tread plate 89 of the grounded shoe C to the footing. Thereupon, with the wheel 11 bottomed on the footing 112 and the shoe C clear of the foot of the tire 11ª, said shoe C will reassume its forward position on the body B of the ski A and said ski body B will be returned to its upper secondary skiing position by the suspension cords E.

In operations involving footings for the ski body B of varying degrees of firmness, variably resistant to movement of the shoe C relative thereto, as distinguished from the situation met in flight of the craft involving no footing (hereinbefore explained in connection with Figs. 10 to 13, inclusive), and as distinguished also from the situation met when the ski body B encounters a solid footing (hereinbefore explained in connection with Figs. 14 to 17, inclusive), it will be understood that results, amounting to combinations of the results growing out of said situations, will occur.

Upon bringing the ski body B into its lower primary skiing position, there is only a slight lifting of the craft-weighted landing wheel 11 as the load transfer shoe C becomes interposed between the wheel and a footing, and this lifting of said wheel is accomplished effectively in the rolling of the wheel up the mild slope of the ramp-like tread plate 89 of the shoe C. For example, see Fig. 17 where the shoe C is grounded on a firm footing 112. Here, the distance through which the craft-weighted landing wheel 11 has been lifted is approximately the short vertical distance between the footing 112 and the forepart of the foot print of the tire 11ª on the tread plate 89. When the shoe C encounters a relatively soft footing as the ski assumes position for its primary skiing operation, the craft-weighted landing wheel 11 is lifted a relatively short though somewhat greater distance than the distance aforesaid, depending upon the effectiveness of the shoe C in sharing the load with the ski body B, said greater distance being less than the vertical distance measured between the footing 112 and the bottom of the ski body B in the relationship of ski body and footing shown in Fig. 14.

A change occurs in the fore and aft relationship between ski body B and aircraft wheel 11 as the ski body moves from its upper secondary skiing position to its lower primary skiing position, or vice versa. However, as will be readily comprehended, this change is slight due to the fact that the drag links D extend generally in the direction of the ski body B. Moreover, this slight change in fore and aft relationship between ski body B and wheel 11 is unaccompanied with any appreciable change in the center of gravity of the ski A in relation to the craft by reason of the fact that, as the body B of the ski moves forwardly relative to the aircraft, the shoe C moves rearwardly relative thereto and, conversely, as the body B of the ski A moves rearwardly relative to the aircraft, the shoe C moves forwardly relative thereto.

In flight of the aircraft, the suspension cords E, by which the body B of the ski is suspended from the craft, act to hold the ski body elevated in its upper secondary skiing position (Fig. 10) with the abutments $x$ on the ski body B rockably engaged with the upper limit stops $d^1$ which, as shown, are the front sleeves 35 of the drag links D. Also in flight of the craft, said cords E act to hold the ski body B in its primary skiing position (Fig. 13) with the shoe C on the ski body B upheld against the foot of the tire 11ª of the aircraft landing wheel 11. These suspension cords E are relatively tensioned so that the ski body B in both primary and secondary skiing positions thereof is properly trimmed in flight of the craft, and so that said ski body B is enabled to pitch in accord with a footing encountered in either primary or secondary skiing operations thereof. In said latter connection, it is to be remembered that the extensibility of each suspension cord E is limted by the structure of its elastic ring unit $e^1$ (Fig. 9), wherein the stop ring 87 within the barrel 83 engages the stop ring 86 on the rod 84. This limitation of the extensibility of said cords E confines the pitching of the ski body B within proper operational limits, as will be readily comprehended. Due to the fact that no appreciable change takes place in the fore and aft relationship of the ski body B and aircraft as the former moves up or down relative to its associated landing wheel of the craft, it follows that no change of consequence occurs in the hang of the suspension cords E as a result of such movement of the ski body.

The branches $B^4$ of the divided ski body B may flex somewhat relative to each other, whereby a greater area of the runner $b^1$ of the ski body B may contact an irregular surface of a footing than would otherwise occur.

The inclined tread plate 89 of the load transfer shoe C, at its lower rearward portion, extends beneath the lower surface of the runner $b^1$ of the body B of the ski and, in addition to its function of supporting a craft-weighted landing wheel in primary skiing operation of the ski, it functions also as a hydro-step beneath the ski body. As a hydro-step, effecting discontinuity at the bottom of the ski structure, the load transfer shoe C receives the brunt of the drag of footing media on the ski, and more or less so according to the extent to which the shoe C is shifted to the rear on the ski body B. Assuming that the actuator $c^1$ has selectively shifted the shoe C into a position such as shown in either of Figs. 11, 12 and 13 for operation in alighting or taxiing on water or wet snow or taking off therefrom, a certain area of the shoe's tread plate 89, peculiar to such positioning of the shoe, will be principally subjected in intended degree to the viscous drag of the footing medium on the ski structure, with the result that the operation will be substantially facilitated. With the shoe C relatively disposed as shown in Fig. 17, the drag of a firm footing on the ski structure will be concentrated at the rear portion of the tread plate 89, thereby enhancing control of the craft in landing, standing or taxiing on such firm footing, or in taking off therefrom.

While it is shown hereinabove that the various stated objectives of our invention are met in the described ski construction in association with the landing wheel of an aircraft, it will be readily appreciated that said construction may be advantageously associated with a supporting wheel of a vehicular structure which may be primarily a land vehicle.

Changes in the specific form of the invention, as herein described, may be made within the scope of what is claimed without departing from the spirit of the invention.

Having described the invention, what is claimed as new and desired to be protected by Letters Patent is:

1. A ski for association with a landing wheel of an aircraft in which association the ski is disposed in co-directional relationship with such wheel and juxtaposed with respect to the lower portion of said wheel, said ski having a body reversely movable vertically from an upper secondary skiing position above the level of the foot of the landing wheel to a lower primary skiing position at such level, a link for coupling the ski body to the aircraft and extending generally fore and aft of the body of the ski, said link being connected at one end to said ski body for vertical pivotal movement and adapted to be similarly connected at its other end to the aircraft, said link enabling the body of the ski to move from one to the other of its said skiing positions while substantially depriving it of longitudinal movement relative to the landing wheel, tensional suspension means connected to the body of the ski and adapted to be connected to the aircraft, said suspension means yieldingly supporting the ski from the aircraft, a load transfer shoe, guide means for the shoe slidably guiding the same along the body of the ski rearwardly from and forwardly in return to a forward position thereon, said shoe having a rearwardly and downwardly sloping tread plate, said tread plate in said forward position of the shoe being disposed above and in part underlain by the bottom of the ski body adjacently in advance of the lower forequarter of the landing wheel, said tread plate, in position of the shoe rearwardly of said forward position of said shoe, engaging the under portion of the landing wheel and projecting downwardly in step-like fashion beneath the bottom of the ski body for contact with a footing, an actuator for moving the shoe relative to the ski body, said actuator having a member connected to the ski body and a relatively movable member connected to the shoe, the movement of said shoe relative to the ski body being attended with one or the other or a combination of two results, one result occurring in flight of the craft or in the absence of substantial resistance by a footing to movement of the shoe relative thereto and being characterized by coaction between the tread plate and landing wheel resulting in the underriding of the landing wheel by the tread plate and the lowering of the tensionally suspended ski thereby, or the withdrawal of the tread plate from the landing wheel freeing the ski for upward return movement thereof, the other result occurring in the presence of substantial resistance by a footing to movement of the shoe relative to such footing and being characterized by load-bearing contact of the tread plate with the footing leading to forward or rearward actuator-induced conjoint movement of the ski body and aircraft attended with the rolling of the landing wheel onto or off from the tread plate.

2. A ski for association with a landing wheel of an aircraft, said ski including a body and coupling means movably connecting the same to the aircraft, said coupling means locating the ski body co-directionally relative to the landing wheel with said ski body juxtaposed with respect to the lower portion of said landing wheel, said ski body being movable vertically from an upper secondary skiing position above the level of the foot of the wheel to a lower primary skiing position at such level, a load transfer shoe movable reversely along the ski body, said shoe having an upper tread surface for the wheel sloping rearwardly downward, means oppositely reacting against the ski body and shoe for moving one thereof relative to the other, guide means slidably guiding the shoe along the ski body rearwardly into position with the tread surface of the shoe underriding the wheel and with the rear portion of the shoe projecting downwardly beneath the bottom of the ski body into position for engagement with a footing, said guide means guiding the shoe forwardly into position in part overlying the bottom of the ski body clear of the wheel adjacently in advance of the lower forequarter thereof, tensional suspension means connected to the ski body and adapted to be connected to the aircraft, said suspension means acting to elevate and yieldingly hold the ski body elevated in its upper skiing position when the shoe is in its said forward position on the ski body, the sloping tread surface of the shoe in the rearward movement of the shoe relative to the ski body being thrust against the wheel into said wheel-underriding position thereof lowering the ski body into its said lower skiing position against the action of said tensional suspension means, said suspension means in said lower skiing position of the ski body yieldingly holding the rearwardly shifted shoe upwardly in wheel-underriding position against the bottom of the wheel, the said coupling means connecting the ski body to the aircraft substantially depriving said ski body of fore and aft movement relative to the landing wheel.

3. A ski, as defined in claim 2, wherein the ski body includes a runner with a bow portion and rearwardly extending legs spaced apart and receiving the landing wheel therebetween, and further includes reinforcing beams for said runner, one beam for each leg of the runner, each beam superimposing its respective leg of the runner and the bow thereof, and the load transfer shoe in its forward position overlies the bow portion of the runner between said reinforcing beams, and the guide means for the shoe includes tracks on the confronting faces of said beams and track followers on said shoe.

4. A ski, as set forth in claim 2, wherein the ski body has a pair of rearwardly extending branches spaced apart and receiving the landing wheel therebetween, and the coupling means connecting the ski body to the aircraft consists of a pair of links extending generally fore and aft of the ski body, one link for each branch of the ski body, each link being connected at its rearward end to its respective branch of the ski body for vertical pivotal movement and adapted to be similarly connected at its forward end to the aircraft, such links enabling the ski body to move up and down relative to the wheel and individually accommodate any flexing of their respective branches of the ski body.

5. A ski for association with a landing wheel of an aircraft, said ski including a body and a coupling link movably connecting the same to the aircraft, said coupling link locating the ski body co-directionally relative to the landing wheel with the ski body juxtaposed with respect to the lower portion of said landing wheel, said link being connected at its rearward end to said ski body for vertical pivotal movement and adapted to be similarly connected at its forward end to the aircraft, said ski body being movable vertically from an upper secondary skiing position above the level of the foot of the wheel to a lower primary skiing position at such level, a load transfer shoe movable reversely along the ski body, said shoe having a tread plate for the wheel sloping rearwardly downward, means for moving the shoe, guide means for the shoe slidably guiding the same along a generally inclined course longitudinally of the ski body rearwardly from and forwardly in return to a forward position thereon, said guide means guiding the shoe rearwardly into position with the rear portion of the tread plate underriding the wheel and projecting downwardly beneath the bottom of the ski body, said guide means guiding the shoe forwardly into position in part overlying the bottom of the ski body clear of the wheel adjacently in advance of the lower forequarter thereof, siad guide means directing the movement of the shoe in manner maintaining the tread plate in substantially tangential relationship relative to the periphery of the wheel, suspension means connected to the ski body and adapted to be connected to the aircraft, said suspension means holding the ski body elevated in its upper skiing position with the shoe in its said forward position clear of the wheel, said suspension means, in the lower skiing position of the ski body, holding the rearwardly shifted shoe in wheel-underriding position against the bottom of the wheel, the said coupling link extending generally fore and aft of the ski body and substantially depriving said ski body of fore and aft movement relative to the landing wheel of the aircraft.

6. A ski for association with a landing wheel of an aircraft, said ski including a body and coupling means movably connecting the same to the aircraft, said coupling means locating the ski body co-directionally relative to the landing wheel with the ski body juxtaposed with respect to the lower portion of said landing wheel, said ski body being movable upwardly from a skiing position at the level of the foot of the wheel and back to such level, a load transfer shoe movable reversely along the ski body, said shoe having an upper tread surface for the wheel sloping rearwardly downward and having a similarly sloping bottom surface, means oppositely reacting against the ski body and shoe for moving one thereof relative to the other, guide means slidably guiding the shoe longitudinally of the ski body rearwardly into position with the tread surface of the shoe underriding the wheel and with the rear portion of the bottom surface of the shoe disposed beneath the bottom of the ski body for engagement with a footing, said guide means guiding the shoe forwardly into forward position clear of the wheel adjacently in advance of the lower forequarter thereof, said guide means, in rearward positions of the shoe, positioning the shoe with its bottom surface in angular step-like disposition relative to the bottom of the ski body, said guide means directing the shoe at a stage in the course of its travel in manner progressively increasing the angularity between shoe and ski body as the shoe moves rearwardly relative to the ski body and, conversely, in manner progressively decreasing the angularity between shoe and ski as the shoe moves forwardly relative to the ski body, suspension means connected to the ski body and adapted to be connected to the aircraft, said suspension means acting to hold the ski body elevated when the shoe is in its said forward position on said ski body and acting, in said skiing position of the ski body, to hold the rearwardly shifted shoe in wheel-underriding position against the bottom of the wheel, the said coupling means connecting the ski body to the aircraft substantially depriving said ski body of fore and aft movement relative to the landing wheel of the aircraft.

7. A ski for association with a landing wheel of an aircraft, said ski including a body and coupling means movably connecting the same to the aircraft, said coupling means locating the ski body co-directionally relative to the landing wheel with said ski body juxtaposed with respect to the lower portion of said landing wheel, said coupling means enabling the ski body to move upwardly from skiing position at the level of the foot of the wheel and back again, suspension means connected to the ski body and adapted to be connected to the aircraft, said suspension means supporting said ski body from the craft, a load transfer shoe movable along the ski body rearwardly from and forwardly in return to a forward position thereon, said shoe in its said forward position being disposed adjacently in advance of the lower forequarter of the wheel above the bottom of the ski body and in large part sheathed thereby from a footing, said shoe in positions thereof rearwardly of said forward position underriding the wheel and projecting downwardly in step-like fashion beneath the bottom of the ski body for contact at its lower surface with a footing, an actuator for moving the shoe back and forth on the ski body, said actuator having a member connected to the ski body and a relatively movable member connected to the shoe, said actuator moving the shoe selectively into the various rearward positions thereof exposing to a footing more or less of the area of the lower surface of the shoe.

8. A ski for association with a landing wheel of an aircraft in which association the ski is disposed in co-directional relationship with such wheel and juxtaposed with respect to the lower portion of said wheel, said ski having a body movable upwardly from skiing position at the level of the foot of the wheel and back to said level, a coupling link extending generally fore and aft of the body of the ski and inclined rearwardly downward, said link being connected at its rear end to the ski body and adapted to be connected at its forward end to the aircraft, said link enabling the ski body to move upwardly from and downwardly in return to its said skiing position, suspension means connected to the ski body and adapted to be connected to the aircraft, said suspension means supporting the ski from the craft, a load transfer shoe movable along the ski body rearwardly from and forwardly in return to a forward position thereon, said shoe in its foward position being disposed adjacently ahead of the lower forequarter of the wheel, said shoe in position rearwardly of its said forward position underriding the wheel, said link in the up and down movement of the ski body permitting but slight longitudinal movement of said ski body resulting in a consequent limited shifting of the weight of the ski body fore and aft of the craft, the forward and rearward positioning of the shoe resulting in the shifting of its weight fore and aft of the craft countering and offsetting the shifting of the weight of said ski body.

9. A ski for association with a landing wheel of an aircraft, said ski including a body and coupling means movably connecting the same to the aircraft, said coupling means locating the ski body co-directionally relative to the landing wheel with the ski body juxtaposed with respect to the lower portion of said landing wheel, said coupling means enabling the ski body to move upwardly from skiing position at the level of the foot of the wheel and down again, a load transfer shoe movable along the ski body, said shoe having a ramp surface for the wheel, means for moving the shoe in a direction thrusting its ramp surface against and into position underriding the wheel and in reverse direction retracting the shoe from the wheel and disposing it in position clear of the wheel, suspension means connected to the ski body and adapted to be connected to the aircraft, said suspension means holding the ski body elevated with the shoe in its said position clear of the wheel, said suspension means, in said skiing position of the ski body, holding the shoe in its said position underriding the wheel, the said coupling means connecting the ski body to the aircraft substantially depriving said ski body of other than up and down movement relative to the landing wheel.

10. A ski for association with a supporting wheel of a vehicle, said ski including a body and a load transfer shoe movable back and forth thereon, coupling means connected to the ski body and adapted to be connected to the vehicle, said coupling means locating the ski body co-directionally relative to the wheel and in juxtaposition with respect thereto, said coupling means enabling the ski body to move downwardly from an upper secondary skiing position above the level of the bottom of the wheel to a lower primary skiing position at such level and back again, while holding the ski body in substantially fixed fore and aft relationship relative to the supporting wheel, suspension means connected to the ski body and adapted to be connected to the vehicle, said suspension means supporting the ski from the vehicle, said load transfer shoe having a tread surface for the wheel sloping rearwardly downward, said shoe being movable along the body of the ski rearwardly from and forwardly in return to a forward position thereon, said shoe in said forward position being disposed adjacently ahead of the lower forequarter of the vehicle wheel, said tread surface of said shoe, in position of the shoe rearwardly of its said forward position, engaging the under portion of the vehicle wheel, the rearwardly positioned shoe projecting downwardly beneath the bottom of the ski body for contact with a footing, one or the other or a combination of two results being obtained upon movement of the shoe relative to the ski body, one result, in the absence of substantial resistance by a footing to movement of the shoe relative to the footing, being characterized by engagement of the sloping tread surface of the shoe with the lower forequarter of the vehicle wheel effecting the underriding of the wheel by the shoe, or the withdrawal of the shoe from the wheel, the other result, in the presence of substantial resistance by a footing to movement of the shoe relative to the footing being characterized by load-bearing contact of the bottom of the shoe with the footing effecting forward or rearward conjoint movement of the ski body and connected vehicle attended by the rolling of the wheel onto or off from the sloping tread surface of the shoe.

References Cited in the file of this patent

UNITED STATES PATENTS

| | | |
|---|---|---|
| 1,668,122 | Mummert et al. | May 1, 1928 |
| 2,361,293 | Jeffries | Oct. 24, 1944 |
| 2,532,610 | Ditter | Dec. 5, 1950 |
| 2,532,611 | Ditter | Dec. 5, 1950 |
| 2,686,023 | Larry | Aug. 10, 1954 |
| 2,733,026 | Ditter | Jan. 31, 1956 |